US008605656B2

(12) United States Patent
Kahn et al.

(10) Patent No.: US 8,605,656 B2
(45) Date of Patent: Dec. 10, 2013

(54) METHOD AND APPARATUS FOR LOCAL GATEWAY ASSIGNMENT IN WIRELESS NETWORKS

(75) Inventors: Colin Kahn, Morris Plains, NJ (US); Alistair Urie, Issy-les-Moulineaux (FR)

(73) Assignee: Alcatel Lucent, Paris (FR)

( * ) Notice: Subject to any disclaimer, the term of this patent is extended or adjusted under 35 U.S.C. 154(b) by 277 days.

(21) Appl. No.: 12/955,014

(22) Filed: Nov. 29, 2010

(65) Prior Publication Data

US 2012/0134319 A1 May 31, 2012

(51) Int. Cl.
H04W 4/00 (2009.01)
(52) U.S. Cl.
USPC .......................................................... 370/328
(58) Field of Classification Search
None
See application file for complete search history.

(56) References Cited

U.S. PATENT DOCUMENTS

| 2004/0032865 | A1 | 2/2004 | Kwon |
| 2004/0120296 | A1 | 6/2004 | Lee et al. |
| 2008/0254768 | A1* | 10/2008 | Faccin ........................ 455/411 |
| 2010/0054222 | A1* | 3/2010 | Rune ............................ 370/338 |
| 2011/0075557 | A1* | 3/2011 | Chowdhury et al. ......... 370/230 |
| 2011/0171953 | A1* | 7/2011 | Faccin et al. ............... 455/426.1 |

FOREIGN PATENT DOCUMENTS

GB 2 465 402 A 5/2010

OTHER PUBLICATIONS

3GPP TS 23.829 V1.3.0, Sep. 2010.*
3GPP TS 23.060 V8.10.0, Sep. 2010.*

Qualcomm Incorporated et al: "Procedural changes to support Solution 5—Selected IP Traffic Offload solution", 3GPP Draft; S2-101764 REVISION0F1721, 3rd Generation Partnership Project (3GPP), Mobile Competence Centre; 650, Route Des Lucioles; F-06921 Sophia-Antipolis Cedex; France, vol. SA WG2, No. San Francisco, USA; 20100222, Mar. 2, 2010, XP050434232 [retrieved on Mar. 2, 2010].
The International Search Report and the Written Opinion of the International Searching Authority, or the Declaration in PCT/US2011/061772, Alcatel-Lucent USA Inc., Applicant, mailed Feb. 21, 2012, 15 pages.
3GPP TS 23.060 v8.5.1 (Jun. 2009), 3rd Generation Partnership Project; Technical Specification Group Services and System Aspects; General Packet Radio Service (GPRS); Service description; Stage 2 (Release 8), Jun. 2009.
3GPP 23.829 v1.3.0 (Sep. 2010), 3rd Generation Partnership Project; Technical Specification Group Services and System Aspects; Local IP Access and Selected IP Traffic Offload (Release 10), Sep. 2010.

* cited by examiner

*Primary Examiner* — Ayaz Sheikh
*Assistant Examiner* — Hai-Chang Hsiung
(74) *Attorney, Agent, or Firm* — Wall & Tong, LLP

(57) ABSTRACT

A local gateway assignment capability is depicted and described herein. In a wireless service provider network, the local gateway assignment capability enables a local gateway, rather than a core gateway, to be selected to serve a user request for an APN. The local gateway and core gateway may be a Local-GGSN (L-GGSN) and a GGSN, respectively, where the L-GGSN is associated with an SGSN and provides local traffic offloading for the GGSN and where the GGSN provides a gateway for the core network portion of the wireless service provider network. A DNS element or other device is configured to determine an SGSN-specific APN in response to receiving a DNS Request from an SGSN. A DNS element is configured to identify, using an SGSN-specific APN associated with an SGSN, an L-GGSN associated with the SGSN, and to provide an indication of the L-GGSN to the SGSN from which the DNS Request is received, thereby enabling the user associated with the DNS Request to use the L-GGSN rather than the GGSN.

18 Claims, 7 Drawing Sheets

METHOD AND APPARATUS FOR LOCAL GATEWAY ASSIGNMENT IN WIRELESS NETWORKS

FIELD OF THE INVENTION

The invention relates generally to communication networks and, more specifically but not exclusively, to assignment of gateways in wireless communication networks.

BACKGROUND

Wireless Service Providers (WSP) urgently need solutions to deal with the explosive growth in data traffic being carried via WSP networks. The growth is at least partially due to the increasing prominence of user devices (e.g., smartphones, tablet computers, and the like) that primarily receive services from Internet-based applications rather than from applications provided by the WSPs. In existing WSP networks, traffic that is destined for the Internet is transported to a handful of core network sites before reaching an Internet Point-of-Presence (POP). Disadvantageously, however, the sizes of the existing WSP networks simply cannot handle the expected traffic volume. Accordingly, WSPs are left with a choice between greatly expanding core network capacities in order to meet the growing traffic volume, or finding a means to offload traffic locally before the traffic reaches the core network.

SUMMARY

Various deficiencies in the prior art are addressed by embodiments for enabling a local gateway, rather than a core gateway, to be selected to serve a request from a User Equipment (UE) for an Access Point Name (APN), thereby providing local offloading of traffic associated with Packet Data Networks (PDNs).

In one embodiment, local gateway selection is provided for a pre-Release-8 3GPP network including a Serving General Packet Radio Service (GPRS) Support Node (SGSN) and a Gateway GPRS Support Node (GGSN), and a Local-GGSN (L-GGSN). In one such embodiment, selection of the L-GGSN, rather than the GGSN, is performed using an SGSN-specific APN associated with the L-GGSN.

In one embodiment, an apparatus includes a processor configured for identifying, in response to a request, an L-GGSN associated with an SGSN, where the L-GGSN is identified using an SGSN-specific APN associated with the SGSN.

In one embodiment, an apparatus includes a processor configured for receiving an APN request including an identifier of the SGSN, and determining, using the identifier of the SGSN, an SGSN-specific APN associated with the SGSN.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

A local gateway assignment capability is depicted and described herein. The local gateway assignment capability enables local offloading of traffic to local gateways of a wireless service provider network such that the offloaded traffic does not need to traverse the entire core network of the wireless service provider network, thereby enabling the wireless service provider to support more traffic without having to provide significant core network upgrades. The local gateway assignment capability enables local offloading of traffic while still using a centralized Domain Name Server (DNS) architecture, thereby obviating the need for the wireless service provider to deploy local DNS servers in order to support local traffic offloading. Although the local gateway assignment capability is primarily depicted and described herein within the context of enabling gateway assignments for supporting offloading of traffic within specific types of wireless networks, it will be appreciated that the local gateway assignment capability may be utilized within any other suitable types of communication networks.

Figure 1:
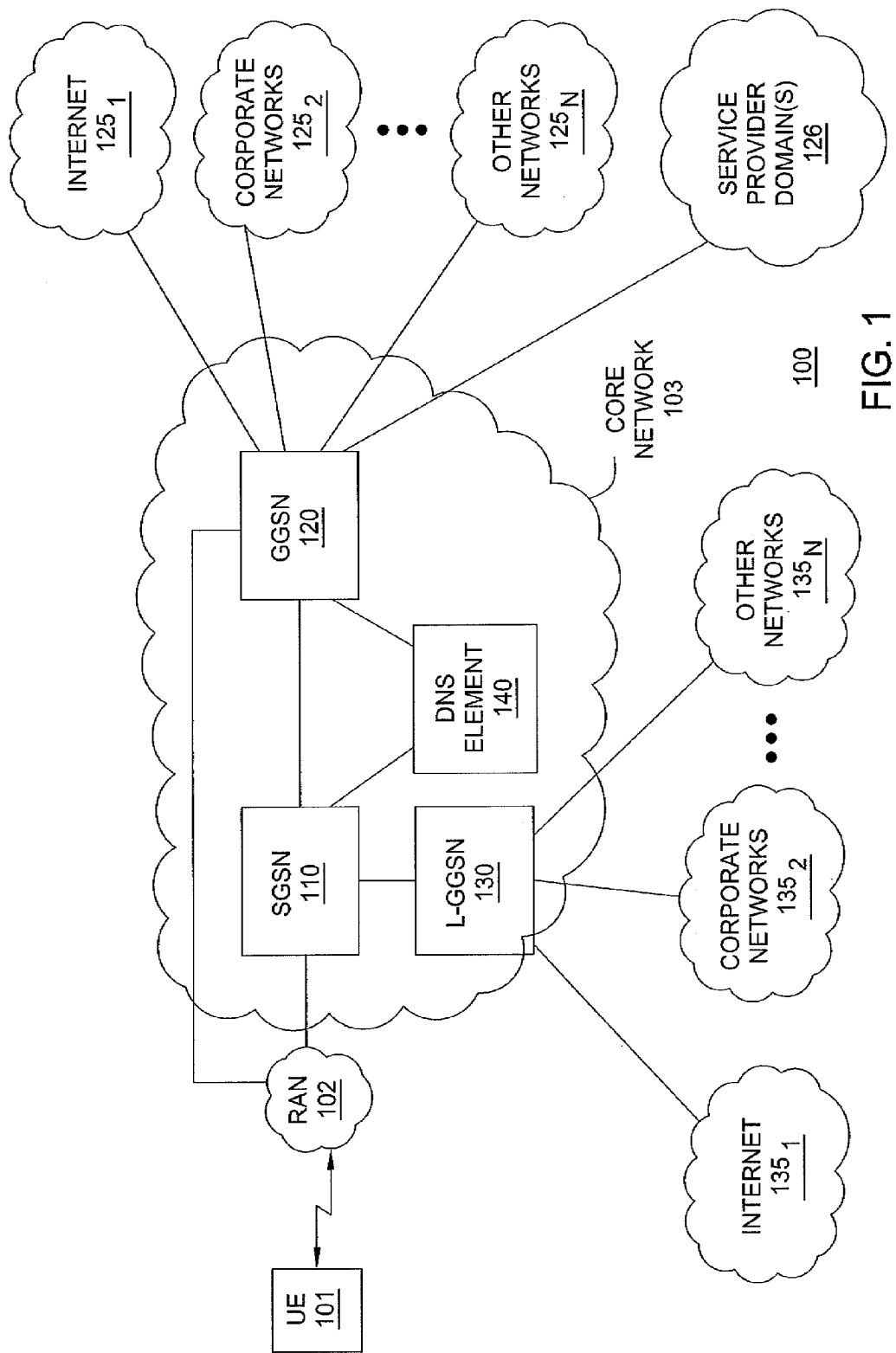
FIG. 1 depicts an exemplary wireless communication system configured for supporting local traffic offloading.

FIG. 1 depicts an exemplary wireless communication system configured for supporting local traffic offloading. As depicted in FIG. 1, exemplary communication system 100 is a wireless communication system.

In one embodiment, exemplary communication system 100 is a Third Generation Partnership Project (3GPP) network. In one such embodiment, the 3GPP network is a pre-Release-8 3GPP network.

The exemplary communication system 100 includes a user equipment (UE) 101 configured for communicating via a Service Provider Network (SPN) including a Radio Access Network (RAN) 102 and a Core Network (CN) 103.

The UE 101 may be any suitable UE which may access RAN 102 and CN 103, such as a mobile phone, a smartphone, a tablet computer, a laptop, and the like.

The RAN 102 is an access network via which UE 101 may access CN 103. The typical configuration of an access network such as RAN 102 will be understood by one skilled in the art. For example, RAN 102 may include one or more base stations (e.g., Node Bs) and one or more associated Radio Network Controllers (RNCs), which are omitted for purposes of clarity. The RAN 102 supports a wireless interface for UE 101 (e.g., via the Node B with which the UE 101 is associated). The CN 103 includes a Serving General Packet Radio Service (GPRS) Support Node (SGSN) 110, a Gateway GPRS Support Node (GGSN) 120, a local GGSN (L-GGSN) 130, and a Domain Name Server (DNS) element 140. The SGSN 110 communicates with both GGSN 120 and L-GGSN

130. The DNS element 140 communicates with both the SGSN 110 and the GGSN 120.

The RAN 102 communicates with CN 103 for purposes of supporting communications for UEs associated with RAN 102 (e.g., via one or more connections between the RNC of RAN 102 and one or more components of CN 103). For example, the RNC of RAN 102 communicates with SGSN 110 for purposes of supporting signaling traffic and, optionally, bearer traffic for UEs associated with RAN 102. The RNC of RAN 102 also may communicate with GGSN 120 directly (e.g., not via SGSN 110) for purposes of supporting bearer traffic for UEs associated with RAN 102. The various configurations of a RAN, such as RAN 102, with respect to facilitating communications between UEs and CN 103 will be understood by one skilled in the art. The SGSN 110 is configured to provide various functions typically provided by an SGSN, such as one or more of transport of signaling packets (and, optionally, bearer packets) to and from UEs within its geographic service area, mobility management functions, logical link management functions, and the like, as well as various combinations thereof. The SGSN 110 also is configured to support various functions of the gateway assignment capability. Although a single SGSN 110 is depicted in CN 103 of FIG. 1, it will be appreciated that CN 103 typically will include many SGSNs associated with the GGSN 120.

The GGSN 120 is configured to provide various functions typically provided by a core GGSN, including supporting communications for CN 103. The GGSN 120 provides interworking between CN 103 and various external packet switched networks (illustratively, Internet $125_1$, corporate networks $125_2$, and other networks $125_N$). The GGSN 120 also provides interworking between CN 103 and a service provider domain(s) 126 of the wireless service provider. The GGSN 120 receives packets originated by UEs and routes the packets to the correct external networks, which may include converting received packets into the appropriate packet data protocol (PDP) formats for the external networks. Similarly, GGSN 120 receives, from the external networks, packets addressed to UEs and delivers the packets to the appropriate SGSNs for delivery to the UEs (e.g., delivering packets intended for UE 101 to SGSN 110 for delivery to UE 101), which may include converting packets from the packet data protocol (PDP) formats for the external networks. The GGSN 120 provides an anchor point for CN 103 that enables mobility of UEs in the CN 103. The GGSN 120 may provide one or more other functions, such as IP address assignment and management, authentication, and the like. Although a single GGSN 120 is depicted in CN 103 of FIG. 1, it will be appreciated that the CN 103 may include multiple GGSNs.

The L-GGSN 130 is configured to provide various functions typically provided by a core GGSN (e.g., such as GGSN 120); however, rather than supporting communications for CN 103 as a whole (as in the case of the GGSN 120 which, in the absence of L-GGSN 130, typically supports communications for all of the SGSNs of CN 103), the L-GGSN 130 supports only a subset of communications for CN 103. As a result, it will be appreciated that where, in the absence of L-GGSN 130, the GGSN 120 would have supported communications for all of the SGSNs of CN 103, the presence of L-GGSN 130 obviates the need for the GGSN 120 to support communications for all traffic of all the SGSNs of CN 103 (rather, GGSN 120, like L-GGSN 130, supports only a subset of the communications for CN 103 when the L-GGSN 120 130 is used).

The L-GGSN 130 is specific to a subset of SGSNs of CN 103, where the subset of SGSNs may include one or more of the SGSNs of CN 103 (shown in this case as SGSN 110, which, as noted, is one of multiple SGSNs associated with GGSN 120 and CN 103, where the other SGSNs have been omitted for purposes of clarity). Accordingly, references herein to SGSN 110 may be considered to be references to SGSN 110 and one or more other SGSNs which may be included within the subset of SGSNs associated with L-GGSN 130 (when such other SGSNs are present).

The L-GGSN 130 provides local access from CN 103 to various external packet switched networks (illustratively, to the Internet $135_1$, to one or more corporate networks $135_2$, and to one or more other networks $135_N$). The L-GGSN 130 allows traffic for local UEs associated with SGSN 110 (illustratively, UE 101) to be supported locally, such that the traffic is not required to traverse the entire CN 103 in order to access PDNs via CN 103, thereby conserving resources in CN 103. As such, it will be appreciated that at least some of the external packet networks accessible via GGSN 120 and L-GGSN 130 may be the same (e.g., Internet $125_1$ and Internet $135_1$), with GGSN 120 and L-GGSN 130 providing different points of access to the same network (e.g., for different types of services, for load balancing purposes, and the like, as well as various combinations thereof).

With respect to GGSN 120 and L-GGSN 130, the determination of whether to use GGSN 120 or L-GGSN 130 is performed in response to a service request (identifying a requested Access Point Name (APN)) that is received from a UE such as UE 101. The CN 103 is configured such that requests for a first set of APNs are served by GGSN 120 and requests for a second set of APNs are served by L-GGSN 130. Thus, directing of the requests for the first set of APNs to GGSN 120 and the requests for the second set of APN Requests to L-GGSN 130 may be arranged within CN 103 based on one or more of the properties of APNs.

An APN requested by a UE typically specifies a packet data network (PDN) with which the UE would like to communicate, e.g., the Internet, a corporate network, a service provider domain (e.g., a private IP network providing a wireless application protocol (WAP) service, a private IP network providing a multimedia messaging service (MMS) service, and the like), and the like. An APN requested by a UE also may specify a service(s) which the UE would like to use. An APN includes a Network Identifier and, optionally, also may include an Operator Identifier. For example, an exemplary APN that does not include an Operator Identifier is "internet" and an exemplary APN that does include an Operator Identifier is "internet.mnc012.mcc345.gprs". The typical format and usage of APNs will be understood by one skilled in the art.

Accordingly, the operator of CN 103 may configure CN 103 such that requests for a first set of APNs (e.g., certain networks and/or services) are served by GGSN 120 and requests for a second set of APNs (e.g., certain networks and/or services) are served by L-GGSN 130. For example, CN 103 may be configured such that some APNs are served by GGSN 120 (e.g., requests to access the service provider domain of the service provider, requests to access certain corporate networks, and the like), while some APNs are served locally by L-GGSN 130 (e.g., requests to access the Internet, requests to access certain corporate networks, and the like, as well as various combinations thereof). Similarly, for example, CN 103 may be configured such that some APNs are served by GGSN 120 (e.g., requests to access the service provider domain of the service provider, most requests to access the Internet (with a few exceptions that are handled by L-GGSN 130), and the like), while some APNs are served locally by L-GGSN 130 (e.g., requests to access YouTube via the Internet, requests to access certain corporate networks, and the like, as well as various combinations thereof). Thus, as described herein, the distribution of networks and/or services and, thus, handling of APN requests associated with those networks and/or services, between the GGSN 120 and the L-GGSN 130 may be arranged in any suitable manner.

The DNS element 140 is configured for providing various functions of the gateway assignment capability. The DNS element 140 is configured to select a gateway to be used by a UE (e.g., the GGSN 120 or L-GGSN 130) when the UE initiates a service request. The DNS element 140 is configured such that (1) the GGSN 120 is selected for requested APNs that are configured within CN 103 to be served by GGSN 120 and (2) the L-GGSN 130 is selected for requested APNs that are configured within CN 103 to be served by L-GGSN 130.

The DNS element 140 stores DNS records, where each DNS record includes a mapping of an APN to a gateway (e.g., GGSN 120 or L-GGSN 130) to be used to serve requests for the APN. In the case of an APN to be served by GGSN 120, the APN in the DNS record for the APN is the requested APN that will be requested by the UE 101.

In the case of an APN to be served by L-GGSN 130, the APN in the DNS record for the APN is a specific APN, which may be based on any information suitable for enabling L-GGSN 130 to be identified when the requested APN (associated with the specific APN) is requested by the UE 101. In one embodiment, the specific APN is specific to the SGSN 110 associated with L-GGSN 130 which is intended to be used to serve the APN and, thus, may be referred to herein as an SGSN-specific APN. The SGSN-specific APN may be made specific to the SGSN 110 in any suitable manner, e.g., by modifying the APN to include an identifier of the SGSN 110 (e.g., an IP address, Fully Qualified Domain Name (FQDN), and the like), by associating a specific APN value to the SGSN 110, and the like, as well as various combinations thereof. In one embodiment, the APNs of the DNS records stored by DNS element 140 include typical APNs mapped to a GGSN(s) (illustratively, to GGSN 120) and SGSN-specific APNs mapped to L-GGSN(s) (illustratively, to L-GGSN 130). The mapping of typical APNs to GGSN 120 is configured prior to use of DNS element 140 to respond to gateway requests in response to service requests from UEs, such that typical APN(s) may be used for searching the DNS records of DNS element 140 during the gateway request process initiated each time a service request is initiated by a UE. Similarly, the mapping of the one or more SGSN-specific APNs for SGSN 110 to L-GGSN 130 are configured in DNS element 140 prior to use of DNS element 140 to respond to gateway requests in response to service requests from UEs, such that the SGSN-specific APN(s) may be used for searching the DNS records of DNS element 140 during the gateway request process initiated each time a service request is initiated by a UE.

In this manner, DNS records of DNS element 140 provide mappings of SGSN-specific APNs to the L-GGSN 130 intended to be used to for serving the requested APNs associated with those SGSN-specific APNs, thereby allowing L-GGSN 130 to be selected when those requested APNs are requested by UEs via SGSN 110. This allows the DNS records associated with L-GGSN 130 to be centrally located in a centralized DNS server (illustratively, DNS element 140), thereby obviating the need for the wireless service provider to deploy a local DNS server dedicated for L-GGSN 130 in order to support local offloading of traffic via L-GGSN 130.

As described herein, since the distribution of traffic between GGSN 120 and L-GGSN 130 may be based on the various types of APNs supported by exemplary communication system 100, the determination as to whether or not to determine an SGSN-specific APN in response to a Service Request also may be based, at least in part, on the APN indicated in the Service Request received at the DNS element 140. For example, a network element that is responsible for determining whether or not to determine an SGSN-specific APN in response to a Service Request may be configured such that: (1) for Service Requests having an APN identifying the Internet, the network element determines an SGSN-specific APN and uses the SGSN-specific APN to identify L-GGSN 130 as being the gateway to support the associated traffic, and (2) for Service Requests having an APN identifying the domain of the Service Provider, the network element does not determine an SGSN-specific APN and, thus, identifies GGSN 120 as being the gateway to support the associated traffic. It will be appreciated that this is merely one example, and that the determination as to whether or not to determine an SGSN-specific APN may be performed at any suitable granularity and described with respect to the manner in which different characteristics of APNs may be used to offload traffic from GGSN 120 to L-GGSN 130. In one embodiment, the DNS element 140 is configured to determine whether or not an SGSN-specific APN is determined in response to a Service Request. In one embodiment, the SGSN 110 is configured to determine whether or not an SGSN-specific APN is determined in response to a Service Request. Various combinations of such embodiments may be used. The operation of the local gateway assignment capability may be better understood by way of reference to FIG. 2, which depicts one embodiment of a method for enabling selection of L-GGSN 130, rather than GGSN 120, in response to a service request, from UE 101, requesting a particular APN that is configured to be served by L-GGSN 130.

Figure 2:
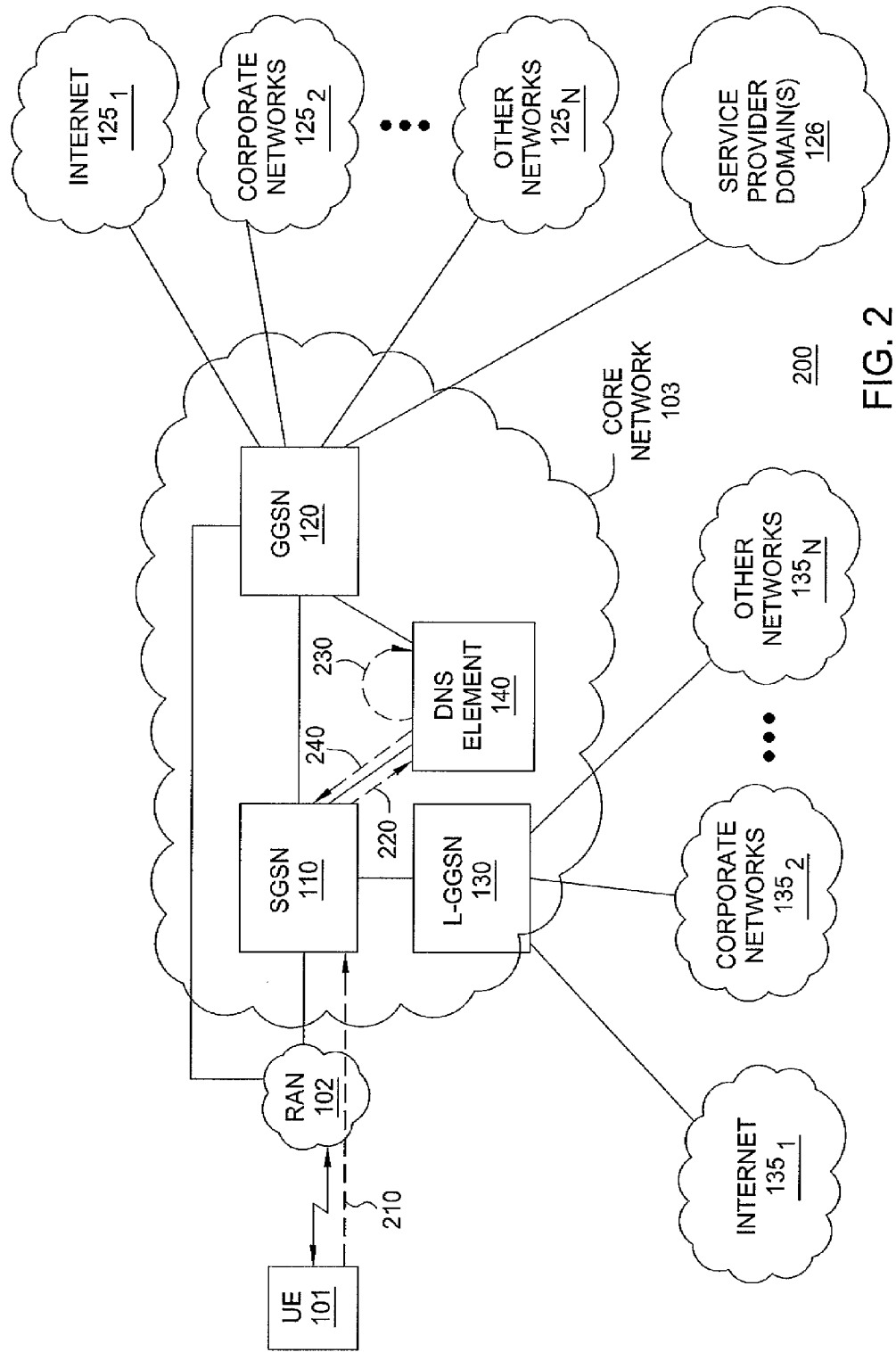
FIG. 2 depicts the exemplary communication system of FIG. 1, illustrating a process for enabling a DNS element to select a local gateway for handling a service request initiated by user equipment.

FIG. 2 depicts the exemplary communication system of FIG. 1, illustrating a process for enabling a DNS element to select a local gateway for handling a service request initiated by user equipment.

At step 210, UE 101 sends a Service Request including a requested APN. The UE 101 sends the Service Request to the SGSN 110 with which UE 101 is associated. As the local gateway assignment capability is directed toward enabling assignment of local gateways, the processing configured for enabling assignment of a local gateways (e.g., L-GGSN 130) for requested APNs is depicted and described herein while existing methods configured for enabling assignment of a core gateway (e.g., GGSN 120) for requested APNs are excluded from the description provided herein. In this embodiment, assume that the requested APN is a request for an APN to be served locally by L-GGSN 130.

At step 220, SGSN 110, in response to the service request from UE 101, sends a DNS request to the DNS element 140. The DNS request is a request for a gateway which may be used by UE 101 in response to the service request. The DNS request includes the requested APN and an SGSN identifier of SGSN 110 (e.g., an IP address of SGSN 110). The DNS request may be sent in any suitable manner, e.g., using standard procedures familiar to those skilled in the art or in any other suitable manner. For example, the DNS request may be sent using the procedure defined in pre-Release 8 versions of 3GPP 23.060 Annex A which is incorporated herein by reference in its entirety.

At step 230, DNS element 140, in response to the DNS request from SGSN 110: (1) determines an SGSN-specific APN associated with the SGSN 110, and (2) identifies, using the SGSN-specific APN, the L-GGSN 130 as being the gateway to serve the service request from UE 101.

The DNS element 140 identifies the L-GGSN 130 as being the gateway to serve the service request from UE 101 by performing a DNS lookup using the SGSN-specific APN. The DNS element 140 may determine the SGSN-specific APN in any suitable manner.

In one embodiment, DNS element 140 generates the SGSN-specific APN using the requested APN and the SGSN identifier associated with the SGSN 110 that is included within the DNS request provided from SGSN 110 to DNS element 140.

In one embodiment, DNS element 140 generates the SGSN-specific APN using the requested APN and the SGSN identifier of SGSN 110 that is included within the DNS request provided from SGSN 110 to DNS element 140 by performing one of: (1) appending at least a portion of the SGSN identifier of SGSN 110 to the requested APN received in the DNS request to form the SGSN-specific APN, (2) prepending at least a portion of the SGSN identifier of SGSN 110 to the requested APN received in the DNS request to form the SGSN-specific APN, (3) inserting at least a portion of the SGSN identifier of SGSN 110 into the requested APN received in the DNS request to form the SGSN-specific APN, or (4) retrieving the SGSN-specific APN from memory using at least a portion of the SGSN identifier of SGSN 110. In one such embodiment, the SGSN identifier of SGSN 110 is the IP address of SGSN 110. It will be appreciated that any other suitable identifier may be used in place of the IP address of SGSN 110.

Figure 3:
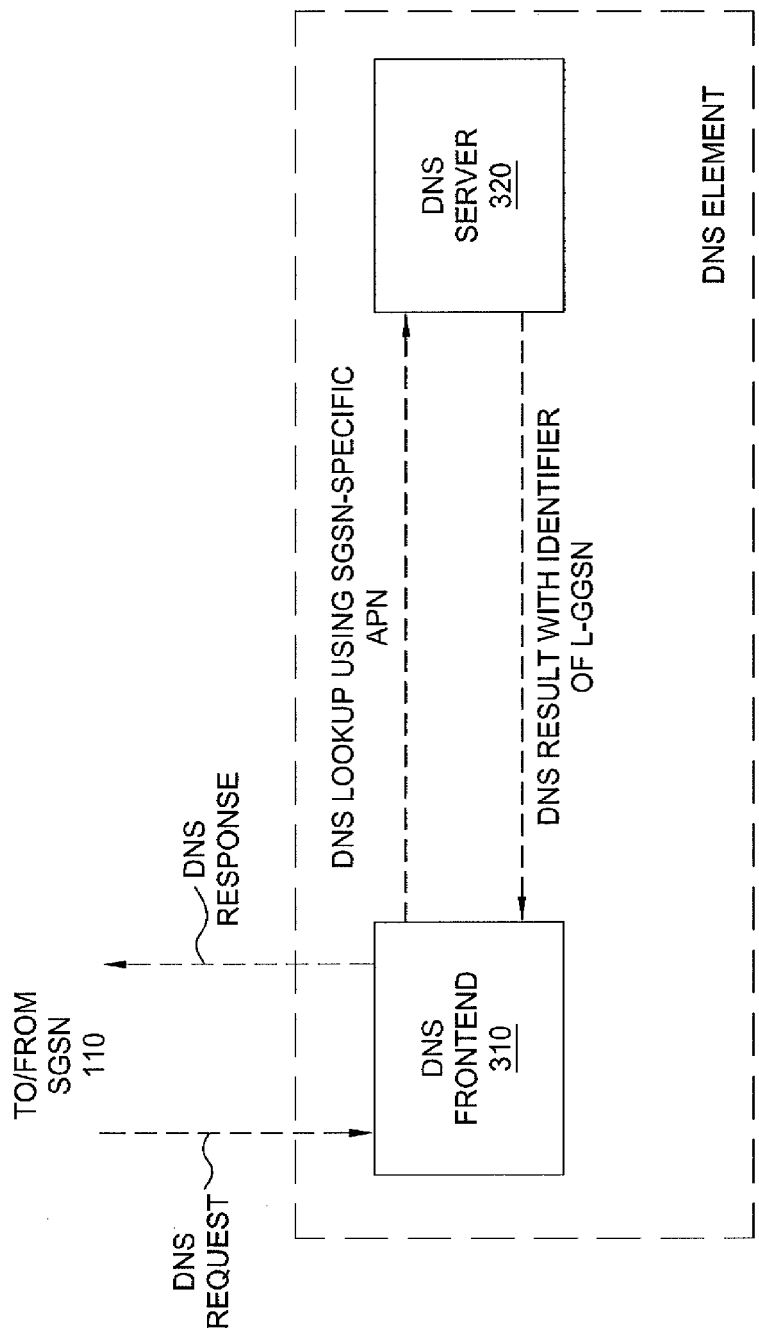
FIG. 3 depicts one embodiment of an implementation of the DNS element that includes a DNS frontend and a DNS server.

In one such embodiment, DNS element 140 is implemented as a DNS frontend and a DNS server. An exemplary embodiment is depicted in FIG. 3, which depicts one embodiment of an implementation of the DNS element that includes a DNS frontend and a DNS server. As depicted in FIG. 3, DNS element 140 of FIG. 2 is implemented using a DNS frontend 310 and a DNS server 320. In this embodiment, the DNS frontend 310 receives the DNS request from SGSN 110, determines the SGSN-specific APN using the Requested APN and the SGSN identifier (e.g., appending, prepending, inserting, lookup, and the like), initiates a DNS lookup to the DNS server 320 using the SGSN-specific APN to retrieve the identifier of the L-GGSN 130, and receives a DNS result from DNS server 320 which includes an identifier of the L-GGSN 130. The DNS frontend 310 then provides the identifier of the L-GGSN 130 to SGSN 110 in a DNS response (as discussed with respect to step 240 of FIG. 2). It will be appreciated that DNS frontend 310 and DNS server 320 may be implemented as different components of one physical device, as different physical devices, and the like.

In one embodiment, DNS element 140 generates the SGSN-specific APN using the requested APN and the SGSN identifier of SGSN 110 that is included within the DNS request provided from SGSN 110 to DNS element 140 by performing a reverse DNS lookup using the SGSN identifier of the SGSN 110 in order to obtain an additional SGSN identifier of SGSN 110, and performing one of: (1) appending at least a portion of the additional SGSN identifier (or at least a location-specific or SGSN-specific portion of the additional SGSN identifier) of SGSN 110 to the requested APN received in the DNS Request to form the SGSN-specific APN, (2) prepending at least a portion of the additional SGSN identifier (or at least a location-specific or SGSN-specific portion of the additional SGSN identifier) of SGSN 110 to the requested APN received in the DNS Request to form the SGSN-specific APN, (3) inserting at least a portion of the additional SGSN identifier (or at least a location-specific or SGSN-specific portion of the additional SGSN identifier) of SGSN 110 into the requested APN received in the DNS Request to form the SGSN-specific APN, or (4) retrieving the SGSN-specific APN from memory using at least a portion of the additional SGSN identifier of SGSN 110. In one such embodiment, the SGSN identifier is the IP address of the SGSN 110 and the additional SGSN identifier of SGSN 110 is the FQDN of SGSN 110. It will be appreciated that any other suitable identifier(s) may be used in place of the IP address and/or the FQDN of SGSN 110.

The DNS element 140 may be implemented using one or more DNS servers, where the number of DNS servers used may impact the types of messaging and/or processing performed in order to determine the SGSN-specific APN and/or to use the SGSN-specific APN to identify the appropriate L-GGSN. A discussion of two exemplary embodiments of DNS element 140 follows (namely, one embodiment in which a single DNS server is used to implement the DNS element 140 and another embodiment in which two DNS servers are used to implement the DNS element 140).

In one such embodiment, DNS element 140 is implemented as a DNS frontend and a DNS server. In this embodiment, the DNS frontend receives the DNS request from SGSN 110, initiates the reverse DNS lookup to the DNS server using the SGSN identifier of SGSN 110 that is included in the DNS request from SGSN 110 to retrieve the additional SGSN identifier of SGSN 110, generates the SGSN-specific APN using the requested APN and the additional SGSN identifier (e.g., appending, prepending, inserting, lookup, and the like), initiates a DNS lookup to the DNS server using the SGSN-specific APN to retrieve the identifier of the L-GGSN 130, and receives a result from the DNS server which includes the identifier of the L-GGSN 130. The DNS frontend then provides the identifier of the L-GGSN 130 to SGSN 110 in a DNS response (as discussed with respect to step 240 of FIG. 2). In one such embodiment, implementation of DNS element 140 as a DNS frontend and a DNS server may be the same as or similar to the implementation depicted and described with respect to FIG. 3 (with DNS frontend 310 and DNS server 320 exchanging an additional reverse DNS lookup and reverse DNS result prior to generation of the SGSN-specific APN by DNS frontend 310). In such embodiments, it will be appreciated that the DNS frontend and the DNS server may be implemented as different components of one physical device, as different physical device, and the like.

Figure 4:
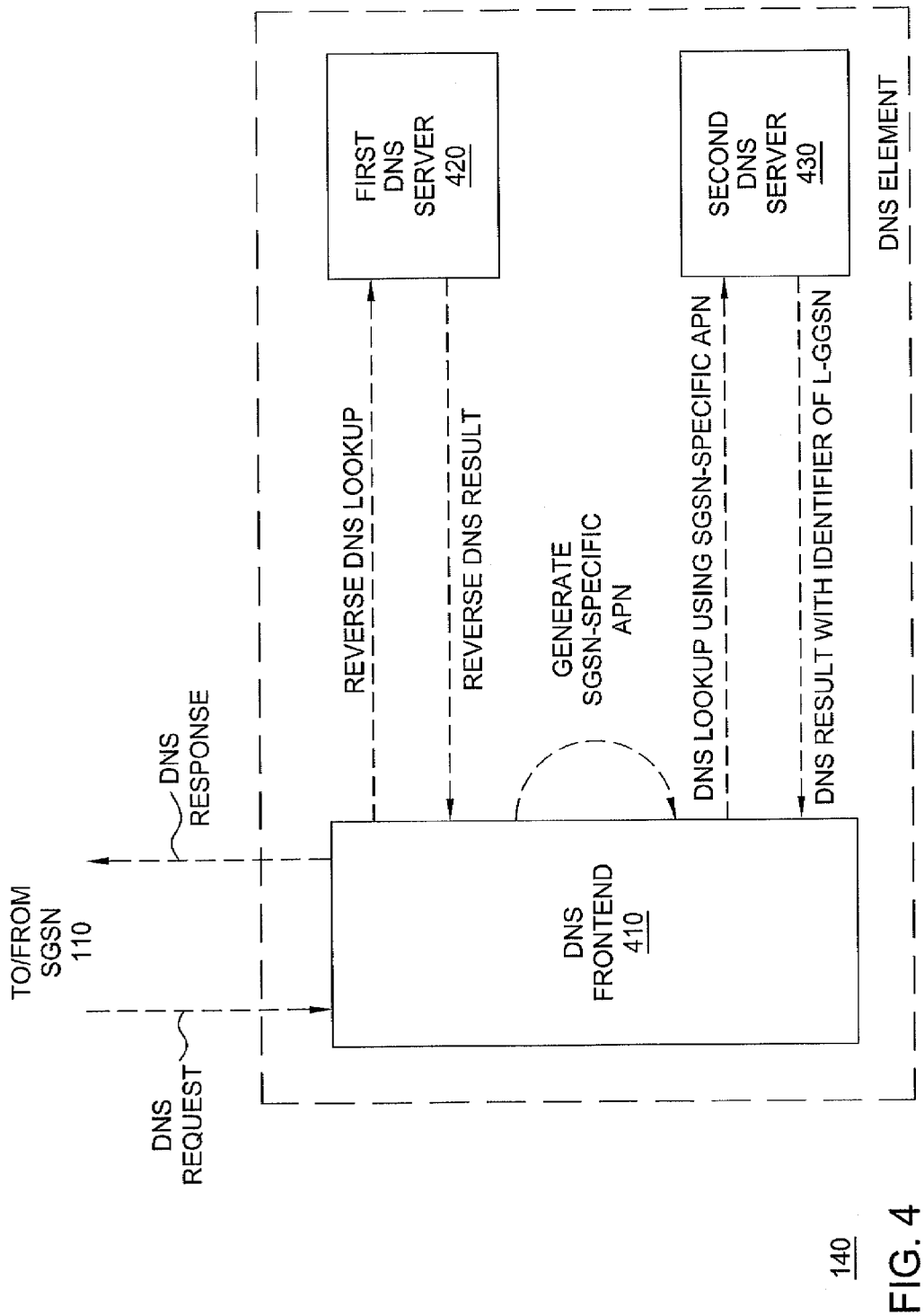
FIG. 4 depicts one embodiment of an implementation of the DNS element that includes a DNS frontend, a first DNS server, and a second DNS server.

In another such embodiment, DNS element 140 is implemented as a DNS frontend, a first DNS server, and a second DNS server. An exemplary embodiment is depicted in FIG. 4, which depicts one embodiment of an implementation of the DNS element 140 that includes a DNS frontend, a first DNS server, and a second DNS server. As depicted in FIG. 4, DNS element 140 of FIG. 2 is implemented using a DNS frontend 410, a first DNS server 420, and a second DNS server 430. In this embodiment, DNS frontend 410 receives the DNS request from SGSN 110, initiates the reverse DNS lookup to the first DNS server 420 using the SGSN identifier of SGSN 110 (e.g., IP address) to retrieve the additional SGSN identifier of SGSN 110 (e.g., FQDN), determines the SGSN-specific APN using the requested APN and the additional SGSN identifier (e.g., appending, prepending, inserting, lookup, and the like), initiates a DNS lookup to the second DNS server 430 using the SGSN-specific APN to retrieve the identifier of L-GGSN 130, and receives a DNS result from second DNS server 430 which includes an identifier of the L-GGSN 130. The DNS frontend 410 then provides the identifier of the L-GGSN 130 to SGSN 110 in a DNS response (as discussed with respect to step 240 of FIG. 2). It will be appreciated that DNS frontend 410, first DNS server 420, and second DNS server 430 may be implemented as different components of one physical device, as different physical devices, and the like.

Although primarily depicted and described herein with respect to an embodiment in which DNS element 140 determines the SGSN-specific APN, in one embodiment the DNS element 140 may receive the SGSN-specific APN. The DNS element 140 may receive the SGSN-specific APN from any suitable source. For example, the DNS element 140 may receive the SGSN-specific APN from SGSN 110 as part of the DNS Request (e.g., where SGSN 110 is configured to generate the SGSN-specific APN and include it within the DNS Request sent to DNS element 140). For example, the DNS element 140 may receive the SGSN-specific APN from a repository of SGSN-specific APNs (e.g., based on a query or request initiated by DNS element 140 using an identifier of SGSN 110 received as part of the DNS Request). The DNS element 140 may receive the SGSN-specific APN from any other suitable source.

At step 240, DNS element 140 sends a DNS response to SGSN 110, where the DNS response identifies L-GGSN 130 as being the gateway to serve the Service Request from UE 101. The L-GGSN 130 may be identified using any suitable identifier (e.g., using an IP address of the L-GGSN 130, using the FQDN of the L-GGSN 130, or using any other suitable identifier). The DNS response may include the SGSN-specific APN, or may include the requested APN (such that the SGSN-specific APN is transparent to the SGSN 110).

Although omitted for purposes of clarity, it will be appreciated that, upon receiving the DNS response identifying L-GGSN 130 as being the gateway to serve the service request from UE 101, SGSN 110 informs UE 101 of the selection of L-GGSN 130 as being the gateway to serve the service request from UE 101, such that the UE 101 may then complete session establishment via L-GGSN 130 for enabling UE 101 to receive the requested service.

With respect to FIG. 2, the process of identifying the L-GGSN 130 as being the gateway to serve the service request from UE 101 may be better understood within the context of an example associated with an exemplary embodiment of FIG. 4. As an example, assume that UE 101 initiates a service request having a requested APN of <Internet> as the user of UE 101 would like to access the Internet. In this example, assume that SGSN 110 which is serving UE 101 is located in Paris, France within operator AAA (FR), and has an associated IP address of 208.77.188.166. The SGSN 110 sends a DNS request, including the requested APN <Internet> and the IP address 208.77.188.166, to DNS element 140. The DNS element 140 performs a reverse DNS lookup using the IP address 208.77.188.166 of SGSN 110 to obtain the FQDN of SGSN 110 (e.g., <sgsn.paris.AAA.fr>). The DNS element 140 then modifies the requested APN of <Internet> by appending a location-specific portion of the FQDN (namely, <paris.AAA.fr>) to the requested APN of <Internet> to form the SGSN-specific APN of <Internet-paris.AAA.fr>. The DNS element 140 then performs a DNS lookup, using the SGSN-specific APN <Internet-paris.AAA.fr>, which returns an identifier associated with L-GGSN 130 (e.g., an FQDN of L-GGSN 130, such as <ggsn1.paris.AAA.fr>). The DNS element 140 then provides the identifier associated with L-GGSN 130 to SGSN 110 for enabling the service request by UE 101 to be handled by L-GGSN 130 rather than GGSN 120. With respect to this example, it will be appreciated that the example merely corresponds to one embodiment as described hereinabove and, thus, may be modified in accordance with any other embodiment depicted and described herein (e.g., prepending the FQDN to the Requested APN, using the IP address of SGSN 110 to form the SGSN-specific APN, and the like).

Figure 5:
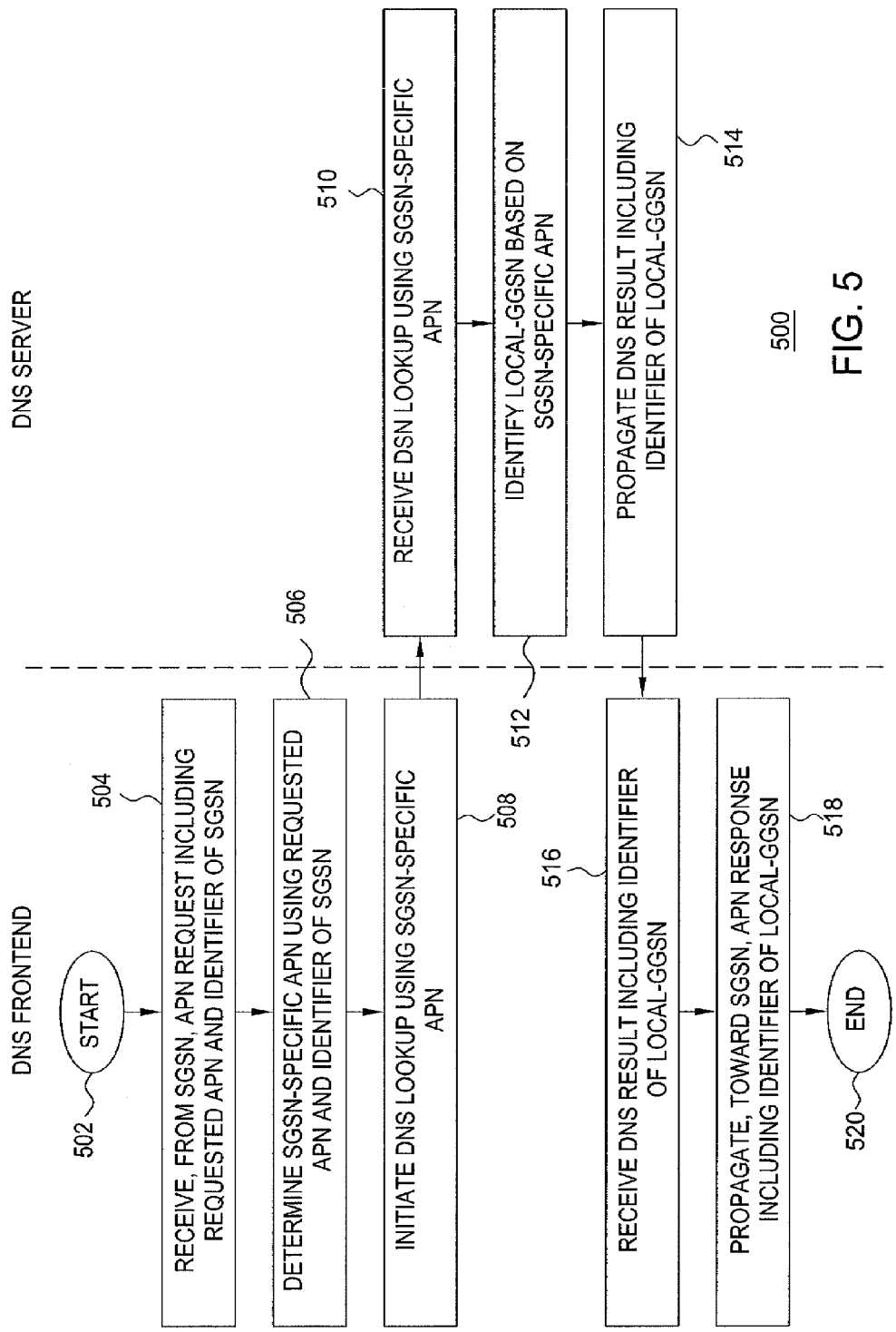
FIG. 5 depicts one embodiment of a method for supporting local traffic offloading.

FIG. 5 depicts one embodiment of a method for supporting local traffic offloading. As depicted in FIG. 5, a portion of the steps are performed by a DNS frontend and a portion of the steps are performed by a DNS server.

At step 502, method 500 begins. At step 504, the DNS frontend receives, from an SGSN, an APN request including a requested APN and an identifier of the SGSN. At step 506, the DNS frontend determines an SGSN-specific APN using the requested APN and the SGSN identifier. At step 508, the DNS frontend initiates a DNS lookup to the DNS server using the SGSN-specific APN. At step 510, the DNS server receives the DNS lookup from the DNS frontend. At step 512, the DNS server identifies an L-GGSN (e.g., an L-GGSN identifier) for the requested APN based on the SGSN-specific APN. At step 514, the DNS server propagates a DNS result to the DNS frontend, where the DNS result includes the L-GGSN identifier of the identified L-GGSN. At step 516, the DNS frontend receives the DNS result including the L-GGSN identifier of the identified L-GGSN. At step 518, the DNS frontend propagates the L-GGSN identifier of the identified L-GGSN toward the SGSN. At step 520, method 500 ends.

As described herein, the steps depicted and described as being performed by the DNS frontend and the DNS server may be implemented using any suitable numbers of logical and/or physical components which may be organized in any suitable manner. Thus, although depicted and described as a single process, it will be appreciated that various portions of method 500 may be implemented as separate processes executed on or by separate modules on the same and/or different physical devices.

As described herein, although primary depicted and described with respect to embodiments in which a single SGSN 110 is associated with a single L-GGNS 130, associations between SGSNs and L-GGSNs may be arranged in various combinations, such as 1:1, 1:N, N:1, and N:N. An exemplary Service Provider Network illustrating such associations is depicted and described with respect to FIG. 6.

Figure 6:
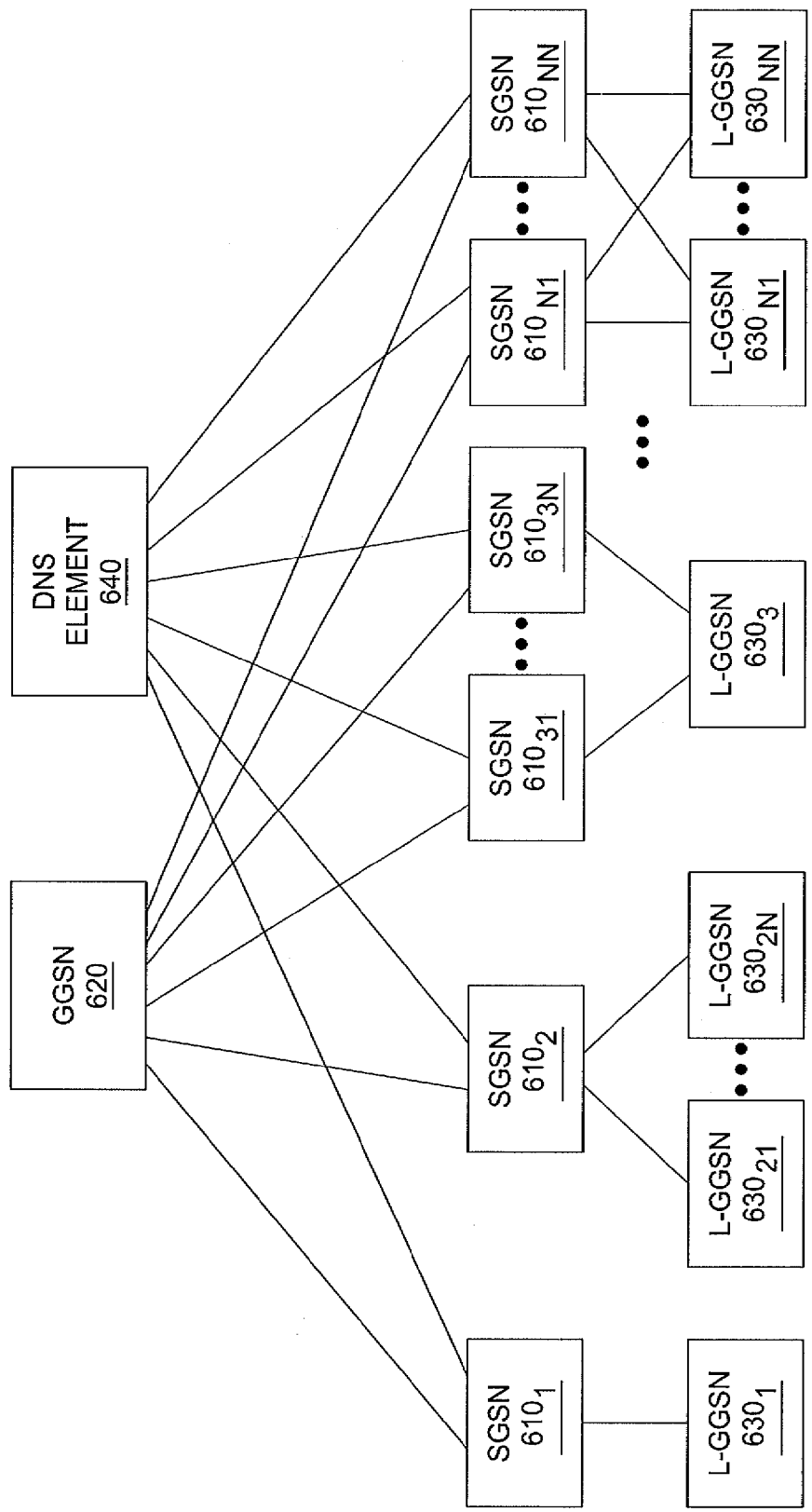
FIG. 6 depicts an exemplary service provider network supporting local traffic offloading using various arrangements of SGSNs and L-GGSNs.

FIG. 6 depicts an exemplary service provider network supporting local traffic offloading using various associations of SGSNs and L-GGSNs. As depicted in FIG. 6, the exemplary service provider network 600 includes a plurality of SGSNs 610, a GGSN 620, a plurality of L-GGSNs 630, and a DNS element 640, which operate in a manner similar to SGSN 110, GGSN 120, L-GGSN 130, and DNS element 140 of FIG. 1, respectively.

The SGSNs 610 and L-GGSNs 630 are arranged in a manner for illustrating various types of associations between SGSNs and L-GGSNs.

For example, a first type of association of SGSNs and L-GGSNs is a 1:1 association in which a single SGSN $610_1$ is associated with a single L-GGSN $630_1$. In this case, the SGSN-specific APN associated with SGSN $610_1$ is used to identify the L-GGSN $630_1$.

For example, a second type of association of SGSNs and L-GGSNs is a 1:N association in which a single SGSN $610_2$ is associated with a plurality of L-GGSNs $630_{21}$-$630_{2N}$. In this case, the SGSN-specific APN associated with SGSN $610_2$ is used to identify one or more of the L-GGSNs $630_{21}$-$630_{2N}$. For example, the SGSN-specific APN associated with SGSN $610_2$ may be used to identify one of the L-GGSNs $630_{21}$-$630_{2N}$ that is configured to handle a specific type of APN being requested (e.g., Internet, corporate, and the like). For example, the SGSN-specific APN associated with SGSN $610_2$ may be used to identify some or all of the L-GGSNs $630_{2_1}$-$630_{2_N}$ such that one of the L-GGSNs $630_{2_1}$-$630_{2_N}$ may be selected by SGSN $610_2$ to handle the APN request (e.g., based on load balancing and/or other suitable considerations).

For example, a third type of association of SGSNs and L-GGSNs is a N:1 association in which a plurality of SGSNs $610_{3_1}$-$610_{3_N}$ is associated with a single L-GGSNs $630_3$. In this case, the SGSN-specific APN associated with SGSN $610_{3_1}$ is used to identify the L-GGSN $630_3$, and the SGSN-specific APN associated with SGSN $610_{3_2}$ is used to identify the L-GGSN $630_3$, and so on, such that L-GGSN $630_3$ is configured to handle APN requests for each of the SGSNs $610_3$.

For example, a fourth type of association of SGSNs and L-GGSNs is an N:N association in which a plurality of SGSNs $610_{N_1}$-$610_{N_N}$ is associated with a plurality of L-GGSNs $630_{N_1}$-$630_{N_N}$. The manner in which such an arrangement may be used will be understood by way of the descriptions of the 1:N and N:1 arrangements.

As will be appreciated at least from the descriptions of the different arrangements provided above with respect to FIG. 6, 1:N associations may be useful for purposes of enabling different services/APNs to be handled by different L-GGSNs, N:1 associations may be useful for purposes of enabling a single L-GGSN to provide traffic offloading for multiple SGSNs, and N:N allocations may be useful for providing combinations of such capabilities.

The GGSN 620 and DNS element 640 each communicate with each of the SGSNs 610. Although depicted and described with respect to this type of arrangement, it will be appreciated that communications between the DNS element 640 and SGSNs 610 may be implemented in any other suitable manner.

As will be appreciated, some or all of such associations may be utilized within individual Service Provider Networks and/or across different Service Provider Networks.

Although primarily depicted and described herein with respect to use of SGSN-specific APNs for identifying L-GGSNs, it will be appreciated that, in at least some embodiments, at least some SGSN-specific APNs also may be considered to be location-specific APNs. For example, an L-GGSN pointed to by a modified APN may be location-specific, meaning that there is one L-GGSN location for that SGSN (and for that modified APN). For example, a modified APN that points to an L-GGSN is a location-specific APN. For example, a modified APN that points to a list of L-GGSNs that is not location specific is not a location-specific APN. For example, a location-specific APN may overtly indicate the location (e.g., <Internet-paris.AAA.fr>) or may imply the location (e.g., <Internet-135.123.456.1>). It will be appreciated that these examples may be applicable to one or more models and, further, that one or more other models may be employed for structuring such information (e.g., by defining an APN that overtly indicates the location as being "location-specific" or in any other suitable manner).

Although primarily depicted and described herein within the context of using the local gateway assignment capability within the context of a pre-Release-8 3GPP network, it will be appreciated that the local gateway assignment capability may be used in various other types of wireless networks.

Although primarily depicted and described herein within the context of using the local gateway assignment capability within the context of wireless network, it will be appreciated that the local gateway assignment capability may be used in various other types of communication networks.

Figure 7:
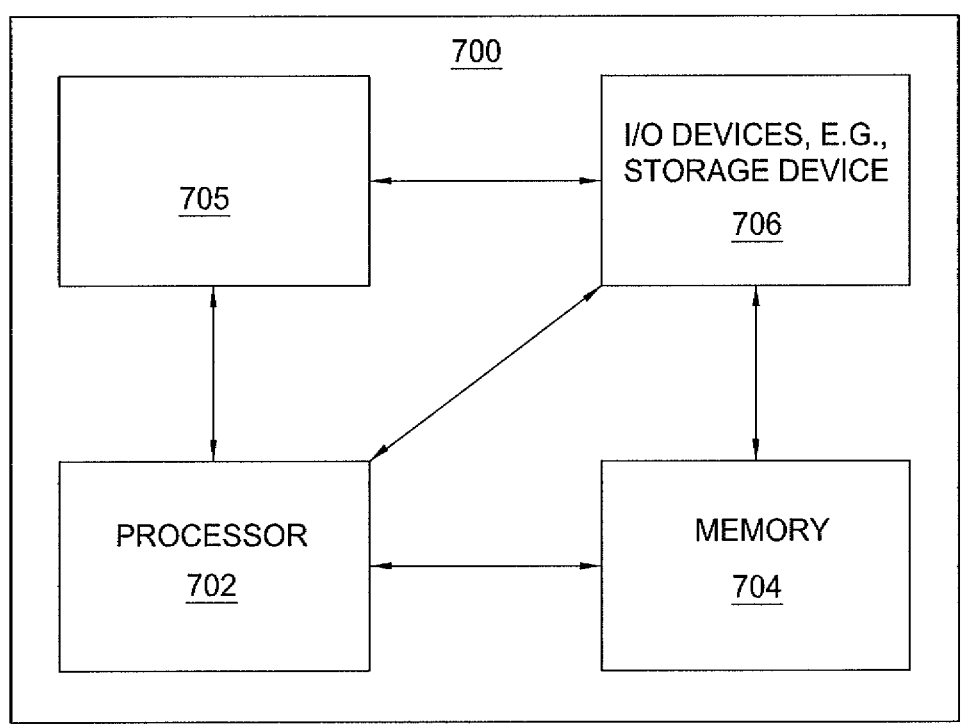
FIG. 7 depicts a high-level block diagram of a computer suitable for use in performing the functions described herein.

FIG. 7 depicts a high-level block diagram of a computer suitable for use in performing functions described herein. As depicted in FIG. 7, computer 700 includes a processor element 702 (e.g., a central processing unit (CPU) and/or other suitable processor(s)) and a memory 704 (e.g., random access memory (RAM), read only memory (ROM), and the like). The computer 700, optionally, may include one or more of a cooperating module/process 705 and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software for executing on a general purpose computer so as to implement a special purpose computer, and/or may also be implemented on hardware, one or more application specific integrated circuits (ASIC), and/or any other hardware equivalents. In one embodiment, the cooperating process 705 can be loaded into memory 704 and executed by processor 702 to implement the functions as discussed herein. Thus, cooperating process 705 (including associated data structures) can be stored on a computer readable storage medium, e.g., RAM memory, magnetic or optical drive or diskette, and the like.

It is contemplated that some of the steps discussed herein as software may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal-bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
 a Domain Name Server (DNS) frontend element comprising a processor and a memory communicatively connected to the processor, the processor configured to:
  receive an Access Point Name (APN) request from a Serving General Packet Radio Service (GPRS) Support Node (SGSN), wherein the APN request comprises an Internet Protocol (IP) address of the SGSN and a requested APN;
  initiate a reverse DNS lookup using the IP address of the SGSN to obtain a Fully Qualified Domain Name (FQDN) of the SGSN;
  modify the requested APN, using at least a portion of the FQDN of the SGSN, to form an SGSN-specific APN; and
  initiate a request to identify a Local Gateway GPRS Support Node (L-GGSN) associated with the SGSN based on the SGSN-specific APN associated with the SGSN;
 a first DNS server configured to receive the reverse DNS lookup including the IP address of the SGSN, identify the FQDN of the SGSN based on the IP address of the SGSN, and propagate the FQDN of the SGSN toward the DNS frontend element; and a second DNS server configured to receive the request to identify the L-GGSN associated with the SGSN based on the SGSN-specific APN associated with the SGSN, identify the L-GGSN associated with the SGSN based on the SGSN-specific APN associated with the SGSN, and propagate an identifier of the L-GGSN toward the DNS frontend element.

2. The apparatus of claim 1, wherein the DNS frontend element is configured to receive the APN request as part of a DNS Request.

3. The apparatus of claim 1, wherein the APN request is associated with a User Equipment (UE).

4. The apparatus of claim 1, wherein the DNS frontend element is configured to modify the requested APN to form the SGSN-specific APN by at least one of:
   appending at least a portion of the FQDN of the SGSN to the requested APN;
   pre-pending at least a portion of the FQDN of the SGSN to the requested APN; and
   inserting at least a portion of the FQDN of the SGSN within the requested APN.

5. The apparatus of claim 1, wherein the DNS frontend element is configured to modify the requested APN to form the SGSN-specific APN using an entire FQDN of the SGSN.

6. The apparatus of claim 1, wherein the DNS frontend element is configured to propagate the identifier of the L-GGSN toward the SGSN.

7. A non-transitory computer-readable storage medium storing instructions which, when executed by a processor, cause the processor to perform steps comprising:
   receiving, at a Domain Name Server (DNS) frontend element, an Access Point Name (APN) request from a Serving General Packet Radio Service (GPRS) Support Node (SGSN), wherein the APN request comprises an Internet Protocol (IP) address of the SGSN and a requested APN;
   initiating, from the DNS frontend element toward a first DNS server, a reverse DNS lookup using the IP address of the SGSN to obtain a Fully Qualified Domain Name (FQDN) of the SGSN;
   receiving, at the first DNS server, the reverse DNS lookup including the IP address of the SGSN;
   identifying, at the first DNS server, the FQDN of the SGSN based on the IP address of the SGSN; and
   propagating the FQDN of the SGSN from the first DNS server toward the DNS frontend element;
   modifying the requested APN at the DNS frontend element, using at least a portion of the FQDN of the SGSN, to form an SGSN-specific APN;
   initiating, from the DNS frontend element toward a second DNS server, a request to identify a Local Gateway GPRS Support Node (L-GGSN) associated with the SGSN based on the SGSN-specific APN associated with the SGSN;
   receiving, at the second DNS server, the request to identify the L-GGSN associated with the SGSN based on the SGSN-specific APN associated with the SGSN;
   identifying, at the second DNS server, the L-GGSN associated with the SGSN based on the SGSN-specific APN associated with the SGSN; and
   propagating an identifier of the L-GGSN from the second DNS server toward the DNS frontend element.

8. The non-transitory computer-readable storage medium of claim 7, wherein the APN request is received as part of a DNS Request.

9. The non-transitory computer-readable storage medium of claim 7, wherein the APN request is associated with a User Equipment (UE).

10. The non-transitory computer-readable storage medium of claim 7, wherein modifying the requested APN to form the SGSN-specific APN comprises at least one of:
    appending at least a portion of the FQDN of the SGSN to the requested APN;
    pre-pending at least a portion of the FQDN of the SGSN to the requested APN; and
    inserting at least a portion of the FQDN of the SGSN within the requested APN.

11. The non-transitory computer-readable storage medium of claim 7, wherein the requested APN is modified to form the SGSN-specific APN using an entire FQDN of the SGSN.

12. The non-transitory computer-readable storage medium of claim 7, further comprising the step of:
    propagating the identifier of the L-GGSN toward the SGSN.

13. A method, comprising:
    using at least one processor and at least one memory for:
      receiving, at a Domain Name Server (DNS) frontend element, an Access Point Name (APN) request from a Serving General Packet Radio Service (GPRS) Support Node (SGSN), wherein the APN request comprises an Internet Protocol (IP) address of the SGSN and a requested APN;
      initiating, from the DNS frontend element toward a first DNS server, a reverse DNS lookup using the IP address of the SGSN to obtain a Fully Qualified Domain Name (FQDN) of the SGSN;
      receiving, at the first DNS server, the reverse DNS lookup including the IP address of the SGSN;
      identifying, at the first DNS server, the FQDN of the SGSN based on the IP address of the SGSN; and
      propagating the FQDN of the SGSN from the first DNS server toward the DNS frontend element;
      modifying the requested APN at the DNS frontend element, using at least a portion of the FQDN of the SGSN, to form an SGSN-specific APN;
      initiating, from the DNS frontend element toward a second DNS server, a request to identify a Local Gateway GPRS Support Node (L-GGSN) associated with the SGSN based on the SGSN-specific APN associated with the SGSN;
      receiving, at the second DNS server, the request to identify the L-GGSN associated with the SGSN based on the SGSN-specific APN associated with the SGSN;
      identifying, at the second DNS server, the L-GGSN associated with the SGSN based on the SGSN-specific APN associated with the SGSN; and
      propagating an identifier of the L-GGSN from the second DNS server toward the DNS frontend element.

14. The method of claim 13, wherein the APN request is received as part of a DNS Request.

15. The method of claim 13, wherein the APN request is associated with a User Equipment (UE).

16. The method of claim 13, wherein modifying the requested APN to form the SGSN-specific APN comprises at least one of:
    appending at least a portion of the FQDN of the SGSN to the requested APN;
    pre-pending at least a portion of the FQDN of the SGSN to the requested APN; and
    inserting at least a portion of the FQDN of the SGSN within the requested APN.

17. The method of claim 13, wherein the requested APN is modified to form the SGSN-specific APN using an entire FQDN of the SGSN.

18. The method of claim 13, further comprising:
propagating the identifier of the L-GGSN toward the SGSN.

* * * * *